(12) United States Patent
Dudda et al.

(10) Patent No.: US 12,160,752 B2
(45) Date of Patent: Dec. 3, 2024

(54) TRANSMITTING DATA WHEN A FIRST CHANNEL ON A FIRST CELL IS OCCUPIED

(71) Applicant: Telefonaktiebolaget LM Ericsson (publ), Stockholm (SE)

(72) Inventors: Torsten Dudda, Wassenberg (DE); Reem Karaki, Aachen (DE); Hubertus Munz, Aachen (DE); Dhruvin Patel, Aachen (DE); Mai-Anh Phan, Herzogenrath (DE); Alexandros Palaios, Moers (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 17/611,615

(22) PCT Filed: Sep. 13, 2019

(86) PCT No.: PCT/EP2019/074593
§ 371 (c)(1),
(2) Date: Nov. 16, 2021

(87) PCT Pub. No.: WO2020/244791
PCT Pub. Date: Dec. 10, 2020

(65) Prior Publication Data
US 2022/0240316 A1    Jul. 28, 2022

(30) Foreign Application Priority Data

Jun. 4, 2019   (WO) ................ PCT/EP2019/064440

(51) Int. Cl.
*H04W 16/14* (2009.01)
*H04W 24/08* (2009.01)
(Continued)

(52) U.S. Cl.
CPC .......... *H04W 16/14* (2013.01); *H04W 24/08* (2013.01); *H04W 36/22* (2013.01); *H04W 48/18* (2013.01);
(Continued)

(58) Field of Classification Search
CPC ..... H04W 16/14; H04W 24/08; H04W 36/22; H04W 48/18; H04W 48/20;
(Continued)

(56) References Cited

U.S. PATENT DOCUMENTS

2009/0046655 A1    2/2009   Zhao et al.
2009/0286541 A1   11/2009   Maheshwari et al.
(Continued)

FOREIGN PATENT DOCUMENTS

WO    2016010276 A1    1/2016
WO    2016164584 A1   10/2016
(Continued)

OTHER PUBLICATIONS

"3GPP TS 23.502 V16.0.2", 3rd Generation Partnership Project; Technical Specification Group Services and System Aspects; Procedures for the 5G System; Stage 2 (Release 16), Apr. 2019, pp. 1-290.
(Continued)

*Primary Examiner* — Kiet Tang
(74) *Attorney, Agent, or Firm* — Murphy, Bilak & Homiller, PLLC

(57) ABSTRACT

Methods and apparatus are provided. In an example aspect, a method of transmitting data is provided. The method comprises determining if a first channel on a first cell is occupied and, if the first channel on the first cell is occupied for at least a predetermined period, transmitting the data on a second channel on a second cell.

15 Claims, 1 Drawing Sheet

(51) Int. Cl.

| | |
|---|---|
| *H04W 36/22* | (2009.01) |
| *H04W 48/18* | (2009.01) |
| *H04W 48/20* | (2009.01) |
| *H04W 72/0446* | (2023.01) |
| *H04W 72/0453* | (2023.01) |
| *H04W 72/1263* | (2023.01) |
| *H04W 72/23* | (2023.01) |
| *H04W 74/08* | (2009.01) |
| *H04W 74/0808* | (2024.01) |
| *H04W 74/0816* | (2024.01) |
| *H04W 80/02* | (2009.01) |

(52) U.S. Cl.
CPC ....... *H04W 48/20* (2013.01); *H04W 72/0446* (2013.01); *H04W 72/0453* (2013.01); *H04W 72/1263* (2013.01); *H04W 72/23* (2023.01); *H04W 74/0808* (2013.01); *H04W 74/0816* (2013.01); *H04W 74/0866* (2013.01); *H04W 80/02* (2013.01)

(58) Field of Classification Search
CPC ......... H04W 72/0446; H04W 72/0453; H04W 72/1263; H04W 72/23; H04W 74/0808; H04W 74/0816; H04W 74/0866; H04W 80/02; H04W 36/0009; H04W 36/0085; H04W 36/14; H04W 72/1215; H04W 36/26; H04L 1/08
See application file for complete search history.

(56) References Cited

U.S. PATENT DOCUMENTS

| | | | |
|---|---|---|---|
| 2011/0007672 A1* | 1/2011 | Park | H04W 16/14 370/280 |
| 2012/0269180 A1 | 10/2012 | Li et al. | |
| 2012/0320881 A1* | 12/2012 | Hong | H04B 7/2659 370/336 |
| 2014/0321376 A1 | 10/2014 | Damnjanovic et al. | |
| 2014/0362780 A1 | 12/2014 | Malladi et al. | |
| 2015/0110018 A1 | 4/2015 | Rosa et al. | |
| 2016/0050667 A1 | 2/2016 | Papasakellariou et al. | |
| 2016/0227425 A1 | 8/2016 | Kim et al. | |
| 2016/0255643 A1 | 9/2016 | Malik et al. | |
| 2017/0202007 A1 | 7/2017 | Miao et al. | |
| 2017/0231013 A1 | 8/2017 | Ahn et al. | |
| 2017/0279565 A1* | 9/2017 | Han | H04L 1/1877 |
| 2017/0353972 A1 | 12/2017 | Babaei et al. | |
| 2018/0084509 A1 | 3/2018 | Lee et al. | |
| 2018/0103458 A1 | 4/2018 | Tooher et al. | |
| 2018/0124612 A1 | 5/2018 | Babaei et al. | |
| 2018/0167823 A1 | 6/2018 | Uchino et al. | |
| 2018/0184475 A1 | 6/2018 | Babaei et al. | |
| 2018/0288623 A1* | 10/2018 | Hampel | H04W 16/14 |
| 2019/0098606 A1 | 3/2019 | Sharma et al. | |
| 2019/0173611 A1 | 6/2019 | Liu et al. | |
| 2019/0349979 A1 | 11/2019 | Park et al. | |
| 2019/0380042 A1 | 12/2019 | Niu et al. | |
| 2020/0100116 A1 | 3/2020 | Chakraborty et al. | |
| 2020/0107373 A1 | 4/2020 | Roy et al. | |
| 2020/0275430 A1 | 8/2020 | Salem | |
| 2020/0305052 A1* | 9/2020 | Yoshino | H04W 64/00 |
| 2020/0314891 A1 | 10/2020 | Li et al. | |
| 2020/0351669 A1 | 11/2020 | Xu et al. | |
| 2021/0345332 A1 | 11/2021 | He et al. | |
| 2021/0352644 A1 | 11/2021 | Zhou | |
| 2021/0392683 A1 | 12/2021 | Awadin et al. | |

FOREIGN PATENT DOCUMENTS

| | | |
|---|---|---|
| WO | 2017014937 A1 | 1/2017 |
| WO | 2017134624 A1 | 8/2017 |
| WO | 2018052349 A1 | 3/2018 |
| WO | 2020244739 A1 | 12/2020 |

OTHER PUBLICATIONS

"Discussion on HARQ operation for LAA", 3GPP TSG RAN WG1 Meeting #80, R1-150633, Athens, Greece, Feb. 9-13, 2015, pp. 1-12.
"Further aspects of data duplication in PDCP layer", 3GPP TSG-RAN WG2 #97, Tdoc R2-1700834, Athens, Greece, Feb. 13-17, 2017, pp. 1-3.
"3GPP TS 38.213 V15.5.0", 3rd Generation Partnership Project; Technical Specification Group Radio Access Network; NR; Physical layer procedures for control (Release 15), Mar. 2019, pp. 1-104.
"3GPP TS 38.331 V15.5.1", 3rd Generation Partnership Project; Technical Specification Group Radio Access Network; NR; Radio Resource Control (RRC) protocol specification (Release 15), Apr. 2019, pp. 1-491.
"ETSI EN 301 893 V2.1.1", 5 GHz RLAN; Harmonised Standard covering the essential requirements of article 3.2 of Directive 2014/53/EU, May 2017, pp. 1-102.
"ETSI TS 138 300 V15.6.0", 5G; NR; Overall description; Stage-2 (3GPP TS 38.300 version 15.6.0 Release 15), Jul. 2019, pp. 1-102.
"HARQ retransmissions on LAA", 3GPP TSG-RAN WG2 #89; R2-150268; Athens, Greece, Feb. 9-13, 2015, pp. 1-4.
"New WID: Support of NR Industrial Internet of Things (Iot)", 3GPP TSG RAN Meeting #83; RP-190728; Shenzhen, China, Mar. 18-21, 2019, pp. 1-6.
"Revised WID on NR-based Access to Unlicensed Spectrum", 3GPP TSG RAN Meeting #83; RP-190706; Shenzhen, China, Mar. 18-21, 2019, pp. 1-8.
"3GPP TS 38.321 V15.5.0", 3rd Generation Partnership Project; Technical Specification Group Radio Access Network; NR; Medium Access Control (MAC) protocol specification (Release 15), Mar. 2019, pp. 1-78.
"Timing and Synchronization for Time-Sensitive Applications", IEEE P802.1AS-Rev/D7.3, Draft Standard for Local and Metropolitan Area Networks, LAN/MAN Standards Committee of the IEEE Computer Society, Aug. 2, 2018, pp. 1-502.
"QoS Control in LAA UL Operation", 3GPP TSG-RAN WG2 Meeting #89bis, R2-151176, Bratislava, Slovakia, Apr. 20-24, 2015, pp. 1-4.
"Broadband Radio Access Networks (BRAN); 5 GHz high performance RLAN; Harmonized EN covering the essential requirements of article 3.2 of the R&TTE Directive", ETSI EN 301 893 V1.8.1, Mar. 2015, pp. 1-93.

\* cited by examiner

TRANSMITTING DATA WHEN A FIRST CHANNEL ON A FIRST CELL IS OCCUPIED

TECHNICAL FIELD

Examples of the present disclosure relate to transmitting data, for example on a second cell if a channel on a first cell is occupied.

BACKGROUND

3GPP radio technologies, such as for example Long Term Evolution (LTE) or New Radio (NR), may be used in licensed spectrum. Initiatives like Licence Assisted Access (LAA), MulteFire and NR-U are solutions to use LTE and NR in unlicensed spectrum. Using unlicensed spectrum may increase the overall capacity of a network if used in parallel to licensed spectrum.

Using unlicensed spectrum, such as for example industrial, scientific and medical (ISM) radio bands, may require the use of Clear Channel Assessment (CCA) or Listen Before Talk (LBT) Medium Access Control (MAC) schemes, in which a transmitter first senses that the transmission medium is free before using it for transmissions.

SUMMARY

One aspect of the present disclosure provides a method of transmitting data. The method comprises determining if a first channel on a first cell is occupied and, if the first channel on the first cell is occupied for at least a predetermined period, transmitting the data on a second channel on a second cell.

Another aspect of the present disclosure provides apparatus for transmitting data. The apparatus comprises a processor and a memory. The memory contains instructions executable by the processor such that the apparatus is operable to determine if a first channel on a first cell is occupied and, if the first channel on the first cell is occupied for at least a predetermined period, transmit the data on a second channel on a second cell.

A further aspect of the present disclosure provides apparatus for transmitting data. The apparatus is configured to determine if a first channel on a first cell is occupied and, if the first channel on the first cell is occupied for at least a predetermined period, transmit the data on a second channel on a second cell.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
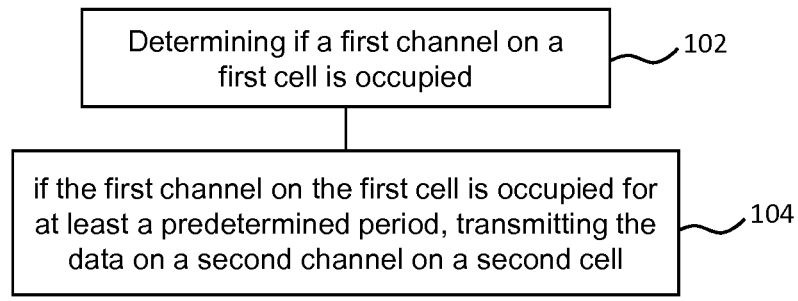
FIG. 1 is a flow chart of an example of a method of transmitting data.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Allowing networks to operate in shared spectrum (or unlicensed spectrum) is an approach that may increase network capacity. Although unlicensed spectrum does not match the qualities of licensed spectrum, for example in terms of reliability, bandwidth, availability and/or latency, solutions that allow an efficient use of unlicensed spectrum as a complement to licensed spectrum (such as, for example, solutions provided herein) have the potential to provide increased capacity while mitigating or avoiding at least some of the drawbacks. Some features in a network technology, such as for example LTE or NR, may need to be adapted to comply with the special characteristics of the unlicensed band as well as also different regulations. When operating in unlicensed spectrum, a device may be required to sense the medium as free before transmitting. This operation is often referred to as Listen Before Talk (LBT). Sensing may be performed in a particular channel (corresponding to a defined carrier frequency) and over a predefined bandwidth. For example, in the 5 GHz band, the sensing is performed over 20 MHz bandwidth. Examples of LBT procedures are described in standards EN 301.893, 5 GHz RLAN, Harmonized standard covering the essential requirements of article 3.2 of Directive 2014/53/EU, which is incorporated herein by reference.

Using unlicensed spectrum and/or Listen Before Talk (LBT) procedures can in some cases cause problems for applications that have a fixed upper bound on the latency of related communications. Additionally or alternatively, applications supporting high reliability and deterministic latency, such as for example URLLC (Ultra Reliable Low-Latency Communications) or HRLLC (Highly Reliable Low-Latency Communications) schemes, may not be suitable for unlicensed spectrum use, as exclusive or guaranteed use of the unlicensed wireless spectrum or unlicensed channels is not provided. URLLC, for example, has strict requirements on transmission reliability and latency, i.e., 99.9999% reliability within 1 ms one-way latency. However, it is not known at a particular time whether unlicensed spectrum is occupied (e.g. by other radio technologies such as Wi-Fi) or can be used for transmissions, and a transmitter may need to wait for a channel in unlicensed spectrum to be free (e.g. no usage of the channel is detected) before it can begin transmissions. Hence, the latency of communications using that channel cannot easily be predicted or controlled, and the reliability of communications using unlicensed spectrum cannot be guaranteed.

URLLC operation has large bandwidth requirements given the need for extremely robust encoding techniques. Licensed spectrum may however be scarce and/or expensive, but nonetheless may be able to guarantee high reliability and QoS levels. Therefore, the use of unlicensed spectrum for communications (e.g. 5G or New Radio, NR, communications as well as other technologies such as LTE) or URLLC communications is considered for examples of this disclosure. It is however currently unclear how URLLC requirements and/or requirements from Time Sensitive Networking (TSN), such as reaching a deterministic low latency performance, can be achieved by operation in unlicensed shared spectrum that is primarily used for best effort services.

Embodiments disclosed herein may provide mechanisms to meet high reliability targets, even when unlicensed spectrum is used or attempts to use unlicensed spectrum are made. Examples propose to exploit cells in unlicensed spectrum as long as reliability and/or latency targets are not compromised, and switch to cells in licensed spectrum where reliability and/or latency targets may not be met by operating on the unlicensed spectrum only. In some examples, a wireless device such as a User Equipment (UE) may initiate switching from an unlicensed to licensed cell. Nonetheless, in some examples, the criteria for the switching may be configured/predefined by the network (e.g. by a network node, base station, eNB or gNB).

FIG. 1 is a flow chart of an example of a method 100 of transmitting data, such as for example URLLC data, MAC PDUs and/or RLC PDUs. The method comprises, in step 102, determining if a first channel on a first cell is occupied. This could comprise for example a Clear Channel Assessment (CCA) or Listen Before Talk (LBT) procedure. The method 100 also comprises, in step 102, if the first channel on the first cell is occupied for at least a predetermined period, transmitting the data on a second channel on a second cell. The second cell is different to the first cell. The CCA procedure, or the LBT procedure or repeated LBT procedures, may indicate that the first channel is occupied for the predetermined period. For example, the CCA procedure or repeated LBT procedures may be initiated as a result of attempting to access the channel for the duration of the predetermined period.

In some examples, the data is associated with a first logical channel, and the first logical channel is associated with the predetermined period. The method 100 may also comprise transmitting further data associated with a second logical channel by determining if the first channel on the first cell is occupied and, if the first channel on the first cell is occupied for at least a further predetermined period associated with the second logical channel, transmitting the further data on the second channel on the second cell. That is, for example, different logical channels may have different predetermined periods associated with them. As a result, the predetermined period for attempting to access the first channel on the first cell may vary depending on the logical channel to which the data belongs. In some examples, the predetermined period may be shorter for logical channels associated with data with higher reliability and/or lower latency requirements. In some examples, the first and/or second logical channel is restricted to transmission on cells on unlicensed spectrum including the first cell, and transmitting the data and/or the further data on the second channel on the second cell comprises temporarily allowing transmission on cells on licensed spectrum including the second cell.

In some examples, the first cell is on unlicensed spectrum and/or the second cell is on licensed spectrum or unlicensed spectrum. Where the second cell is on licensed spectrum, gaining access to the second channel on the second cell may be considered as unlikely to fail in some examples.

In some examples, transmitting the data on the second channel on the second cell comprises performing a Radio Link Control (RLC) retransmission of the data, such as one or more RLC Protocol Data Units (PDUs), on the second channel on the second cell. Thus the retransmission is not done on the original cell (the first cell).

After transmitting the data on the second channel on the second cell, in some examples, the method 100 may comprise transmitting subsequent data on the second channel on the second cell for a further predetermined period. So, for example, if the first channel on the first cell continues to be occupied for at least part of the further predetermined period, transmitting the subsequent data will not attempt to access the first channel and instead will be attempted for transmission first on the second cell. An indication of the further predetermined period may be received from a network node or base station in some examples.

In some examples, the data comprises one or more Medium Access Control, MAC, PDUs. The size of the PDU is no greater than a smaller of a maximum PDU size on the first channel and a maximum PDU size on the second channel. This is so that, for example, if transmission on the first channel on the first cell fails (e.g. the channel is occupied for the predetermined time), the PDU can be sent on the second channel instead without modification or without significant modification.

Transmitting the data on the second channel on the second cell in some examples comprises performing a HARQ retransmission of the data on the second channel on the second cell. Performing the HARQ retransmission may comprise copying the data from a HARQ buffer associated with the first cell to a HARQ buffer associated with the second cell. In other examples, however, the HARQ buffer associated with the first cell may be associated with the second cell instead for the HARQ retransmission.

In some examples, the predetermined period is less than a maximum allowable latency for the data. For example, the predetermined period is less than or equal to the maximum allowable latency for the data minus a switching time for switching to the second cell minus a transmission time for the data on the second cell. This may ensure that the latency target is met while attempting to use the first channel on the first cell, which may for example be a cell in unlicensed spectrum.

In some examples, the first channel on the first cell is determined to be available within the predetermined period, such as for example following a successful LBT or CCA procedure. As a result, the method 100 may comprise transmitting the data on the first channel on the first cell.

The method 100 may in some examples be performed by a wireless device, such as for example a User Equipment UE), that may be communicating with a network node or base station. Thus, for example, the first cell may be a first serving cell for the wireless device, and the second cell may be a second serving cell for the wireless device. In some examples, an indication of the predetermined period may be received from a network node or base station. Thus for example the predetermined period may be configurable by the network. In some examples, transmitting the data on the second channel on the second cell comprises transmitting the data to a network node or base station. This may comprise transmitting a scheduling request to the base station, and transmitting the data after receiving a scheduling grant from the base station. This may be applicable for example where the second cell is a cell on licensed spectrum.

In other examples, the method 100 may be implemented in a base station. Thus, the indication may be transmitted to a wireless device such as a UE. In some examples, if the first channel on the first cell is occupied for at least a predetermined period, causing the wireless device and/or at least one further wireless device to use the second channel on the second cell instead of the first channel on the first cell for transmitting at least some data.

Particular examples will now be described. If a transmission attempt on a serving cell operating in unlicensed/shared spectrum (referred to as Unlicensed or U herein) fails, meaning that it could not be transmitted in a certain time budget T_PDBU, a (re)transmission attempt is made of that data in another serving cell, which in some examples operates on licensed spectrum (referred to as Licensed or L herein) and therefore it can be assumed that the transmission attempt of the retransmission is unlikely to fail. Some examples therefore concern the switch of data transmission from U to L if the transmission could not be done within T_PDBU on U, where T_PDBU may in some examples represent a packet delay budget (PDB) for transmission attempts on U. This may be configurable by the network in some examples. When referring to transmissions on U and L or cells on U and L, this may also comprise for example transmissions performed according to an uplink grant for a serving cell operating on U or L. However, some examples are also applicable to switching the transmission to another unlicensed cell, for example another unlicensed cell that is serving less traffic than the first cell.

T_PDBU may relate to a maximum time to tolerate listen-before-talk (LBT) failure(s) or to the maximum number of LBT attempts, and/or the threshold T_PDBU may be configured per logical channel. Thus, for example, for data of certain QoS mapped to certain logical channel, a maximum transmission attempt time (e.g. predetermined period) on U can be defined. Once this maximum transmission attempt time is reached or a transmission on U, the cell on U may be deemed of insufficient reliability for the logical channel, and transmission/retransmission of the data may instead be performed on L. T_PDBU may in some examples be configured via Radio Resource Control (RRC) for a logical channel and may for example be set to a fraction of the packet delay budget (PDB) of the corresponding QoS flow on the logical channel.

Logical channels can be restricted to transmissions on certain serving cells, such as for example only on cells in unlicensed spectrum. When transmission of data for a logical channel is restricted to U, and a switch from serving cell U to serving cell L is desired, these restrictions may lifted or at least temporarily lifted or only for the retransmission of the data on L, so that data can be transmitted on L instead of U.

In some examples, the network (e.g. network node, base station, eNB or gNB) may configure the UE to perform the switch from a first cell to a second cell (e.g. U to L) as disclosed herein. The network may indicate for example on which U cell(s) the switching is allowed. Furthermore, the network may indicate to the wireless device to which cell(s) on L the switching should be performed.

Retransmission of the data that was not transmitted sufficiently quickly on U (or even at all), e.g. within the predetermined period, can be done in different ways. In a first example, retransmissions are done on RLC layer. Only one logical channel is defined, i.e. one RLC entity, and if RLC PDUs were not transmitted within T_PDBU on U (i.e. on the first channel on the first cell), an RLC retransmission of the data is initiated, and this RLC retransmission is done on L rather than on U. Due to a larger delay to receive ACK/NACK via RLC-status reporting i.e. after receiving the RLC status report from the network regarding successful/non-successful U transmission, the retransmission on RLC layer may be triggered locally by a MAC layer in some examples. If the corresponding MAC PDU(s) are not acknowledged within time T_PDBU, an indication is sent from MAC to RLC, so that RLC thereafter considers the corresponding RLC PDU as negatively acknowledged (NACK) and initiates retransmission on L. The PDU on U is then discarded, i.e. the wireless device stops attempting to transmit the same PDU on U. In a variant of this example, the UE may stop attempting to transmit on U for a certain time period for subsequent PDUs as well.

In another example, a protocol architecture corresponding to the protocol architecture of PDCP duplication is considered, where a PDCP entity is associated with multiple RLC entities, i.e. multiple logical channels, and where data of those logical channels is transmitted on different serving cells. PDCP duplication may not be performed all the time, and instead transmission of PDCP PDUs may only be done on a logical channel that is restricted for transmissions on U, and only if indicated by MAC layer that T_PDBU has been reached, a PDCP duplicate transmission is done via the (so far on standby) secondary logical channel for which restrictions are configured allowing only transmissions on L. In a variant of this example, PDCP duplicate transmission may be activated from this moment on, i.e. applied to the current PDCP PDU and subsequent PDUs, until duplication is deactivated (e.g. after a certain time period). In another example, the PDU on U may be discarded. The wireless device attempts to transmit its duplicate on the L. This may help to reduce congestion on U in some cases. Also, only using L when the transmission on U is unsuccessful may help to reduce congestion on L.

In another example, the RLC and PDCP layers are not involved in the switch from the first cell to the second cell (e.g. U to L). When a data transmission is to be performed, a MAC PDU may be formed and kept in a HARQ process buffer of a certain HARQ ID when provided for transmission on a physical layer. The size of the MAC PDU may therefore depend on the chosen uplink transmission size, which may be provided within an uplink grant for transmissions on U. The network (e.g. network node, base station, eNB or gNB) may provide the appropriate uplink grant or configured uplink grant for retransmission on L. To allow retransmission of a PDU on L that was previously transmitted on U, the MAC PDU must fit on L. That is, for example, when the wireless device attempts transmission of data on U, the transmission size on U is smaller or equal to the configured grant size on L. In other words, the wireless device can only switch the transmission of a MAC PDU from U to L if the uplink grant size on U is smaller or equal to the uplink grant size on L (or at least the size of the PDU us smaller than or equal to the uplink grant size on L). HARQ buffers may be separate for different serving cells, and so the wireless device may be able to copy the data for transmission from a HARQ buffer for U to a HARQ buffer for L. Alternatively, the wireless device may be enabled to transmit from a certain HARQ buffer on both U and L. The (re)transmission procedure described herein can be regarded as the switch from U to L, and may correspond to a HARQ retransmission.

In some examples of this disclosure, retransmission of data may happen quickly, e.g. faster than a typical HARQ round trip time (RTT). Resources may be available for transmission on L, e.g. preconfigured resources such as configured uplink grant resources. In some examples, the wireless device may be pre-configured with secondary resources on L. The secondary resources are not to be used by the UE, unless the UE fails to successfully transmit the transmission on U within a delay budget (e.g. T_PDBU). This can be considered as a transmission or logical channel prioritization restriction: uplink resources on L are only usable for this logical channel, if time T_PDBU is reached for a transmission of data of this logical channel on U. The transmission may be allowed for only this data for which T_PDBU is reached, or also for all subsequent logical channel data (e.g. for a certain time period).

Figure 2:
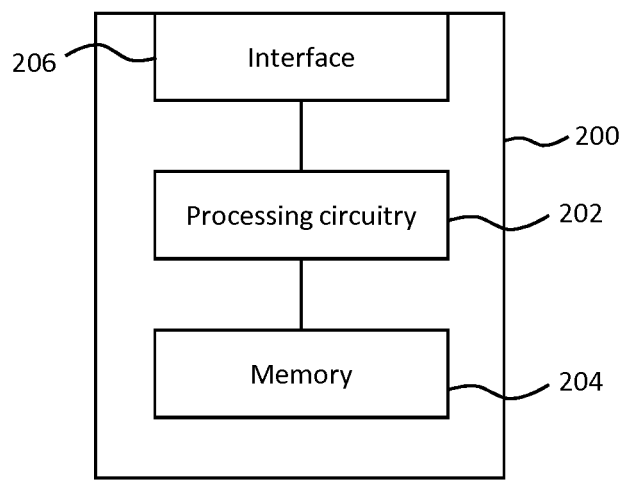
FIG. 2 is a schematic of an example of apparatus for transmitting data.

FIG. 2 is a schematic of an example of apparatus 200 for transmitting data. The apparatus 200 200 comprises processing circuitry 202 (e.g. one or more processors) and a memory 204 in communication with the processing circuitry 202. The memory 204 contains instructions executable by the processing circuitry 202. The apparatus 200 also comprises an interface 206 in communication with the processing circuitry 202. Although the interface 206, processing circuitry 202 and memory 204 are shown connected in series, these may alternatively be interconnected in any other way, for example via a bus.

In one embodiment, the memory 204 contains instructions executable by the processing circuitry 202 such that the apparatus 200 is operable to determine if a first channel on a first cell is occupied and, if the first channel on the first cell is occupied for at least a predetermined period, transmit the data on a second channel on a second cell. In some examples, the apparatus 200 is operable to carry out the method 100 described above with reference to FIG. 1.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting data on cells of a network, the method comprising:
    determining whether a first channel on a first cell is occupied; and
    when it is determined that the first channel on the first cell is occupied for at least a predetermined period, transmitting the data on a second channel on a second cell, wherein the predetermined period is less than or equal to a maximum allowable latency for the data, minus a switching time for switching to the second cell, minus a transmission time for the data on the second cell.

2. The method of claim 1, wherein:
    the data is associated with a first logical channel;
    the first logical channel is associated with the predetermined period; and
    the method further comprises, when it is determined that the first channel on the first cell is occupied for at least a further predetermined period associated with a second logical channel, transmitting further data associated with the second logical channel on the second channel on the second cell.

3. The method of claim 1, wherein one or more of the following applies: the first cell is on unlicensed spectrum, and the second cell is on licensed spectrum or unlicensed spectrum.

4. The method of claim 1, wherein transmitting the data on the second channel on the second cell comprises performing a radio link control (RLC) retransmission of the data on the second channel on the second cell, wherein the data comprises one or more RLC protocol data units (PDUs).

5. The method of claim 1, comprising, after transmitting the data on the second channel on the second cell, transmitting subsequent data on the second channel on the second cell for a further predetermined period.

6. The method of claim 5, comprising receiving an indication of the further predetermined period from a base station of the network.

7. The method of claim 1, wherein:
    the data comprises one or more Medium Access Control (MAC) protocol data units (PDUs); and
    the size of each MAC PDU is no greater than the following: a maximum PDU size on the first channel, and a maximum PDU size on the second channel.

8. The method of claim 1, wherein transmitting the data on the second channel on the second cell comprises:
    copying the data from a hybrid ARQ (HARQ) buffer associated with the first cell to a HARQ buffer associated with the second cell; and
    performing a HARQ retransmission of the data on the second channel on the second cell.

9. The method of claim 1, wherein the method is performed by a wireless device.

10. The method of claim 9, comprising receiving an indication of the predetermined period from a base station of the network.

11. The method of claim 9, wherein transmitting the data on the second channel on the second cell comprises:
    transmitting a scheduling request to a base station of the network;
    receiving a scheduling grant from the base station responsive to the scheduling request; and
    transmitting the data to the base station based on the scheduling grant.

12. The method of claim 1, wherein the method is performed by a base station in the network, and the data is transmitted to a wireless device.

13. The method of claim 12, further comprising, when it is determined that the first channel on the first cell is occupied for at least the predetermined period, causing at least one of the following to use the second channel on the second cell instead of the first channel on the first cell for transmitting data to the network: the wireless device, and at least one further wireless device.

14. A wireless device configured to transmit data on cells of a network, the wireless device comprising:

a processor; and a memory storing instructions executable by the processor, wherein execution of the instructions by the processor causes the wireless device to perform operations corresponding to the method of claim 1.

15. A network node configured to transmit data on cells of a network, the network node comprising:

a processor; and a memory storing instructions executable by the processor, wherein execution of the instructions by the processor causes the wireless device to perform operations corresponding to the method of claim 1.

* * * * *